(12) United States Patent
Bronson et al.

(10) Patent No.: US 8,335,670 B2
(45) Date of Patent: Dec. 18, 2012

(54) PROBABILISTIC UNCERTAINTY ESTIMATOR

(75) Inventors: Frazier Bronson, Branford, CT (US); Valery Atrashkevich, Moscow (RU)

(73) Assignee: Canberra Industries, Inc., Meriden, CT (US)

( * ) Notice: Subject to any disclaimer, the term of this patent is extended or adjusted under 35 U.S.C. 154(b) by 685 days.

(21) Appl. No.: 12/293,343

(22) PCT Filed: Mar. 19, 2007

(86) PCT No.: PCT/US2007/006802
§ 371 (c)(1),
(2), (4) Date: Oct. 5, 2008

(87) PCT Pub. No.: WO2007/109226
PCT Pub. Date: Sep. 27, 2007

(65) Prior Publication Data
US 2009/0292493 A1 Nov. 26, 2009

Related U.S. Application Data

(60) Provisional application No. 60/783,560, filed on Mar. 17, 2006.

(51) Int. Cl.
*G06F 7/60* (2006.01)
*G06F 17/18* (2006.01)
*G01D 18/00* (2006.01)

(52) U.S. Cl. ................................ 703/2; 702/85; 702/179

(58) Field of Classification Search ........ 703/2; 702/85, 702/179
See application file for complete search history.

(56) References Cited

U.S. PATENT DOCUMENTS

| | | | | |
|---|---|---|---|---|
| 5,095,217 A | * | 3/1992 | Attix | 250/374 |
| 5,541,415 A | * | 7/1996 | Shonka | 250/374 |
| 6,228,664 B1 | | 5/2001 | Bronson et al. | |
| 6,453,223 B1 | * | 9/2002 | Kelly et al. | 701/28 |
| 6,934,653 B2 | * | 8/2005 | Ritt | 702/104 |
| 7,383,128 B2 | | 6/2008 | Chandler | |
| 2006/0217925 A1 | | 9/2006 | Taron et al. | |

FOREIGN PATENT DOCUMENTS

EP  1176431 A1  1/2002

OTHER PUBLICATIONS

Venkataraman R et al., "Improved detector response characterization method in ISOCS and LabSOCS", Journal of Radioanalytical and Nuclear Chemistry, Kluwer Academic Publishers, DO, vol. 264, No. 1, Mar. 1, 2005, pp. 213-219, XP019251919, ISSN: 1588-2780 (the whole document).

Bonson F L et al., "Mathematical Calibration of GE Detectors, and the Instruments that Use Them", Nondestructive Assay and Nondestructive Examination Wastecharacterization Conference, XX, XX, Jan. 14, 1997, pp. 1-12, XP002910376 (the whole document.

* cited by examiner

*Primary Examiner* — Kandasamy Thangavelu
*Assistant Examiner* — Nithya Janakiraman
(74) *Attorney, Agent, or Firm* — David W. Carstens; Kevin M. Klughart; Carstens & Cahoon, LLP

(57) ABSTRACT

A system for determining the calibration factor uncertainty of a radiation sensor. A computing device accepts a mathematical model of the sensor, sample, and other items affecting the calibration factor, wherein each known mathematical model parameter is assigned its normal dimensions or values and each not-well-known parameter is assigned a variable with an upper and lower limit, and a shape parameter that describes the parameter may vary within or about the limits. Random values consistent with the upper and lower limits and shape parameters for each of the variable parameters in the model are then selected, to create a mathematical model of one possible variation of source-detector measurement configuration. The selection and calibration factor computation are then repeated a large number of times and statistical parameters describing the calibration factor and uncertainty are then computed. Another embodiment performs the steps at different energies for spectroscopic detectors.

2 Claims, No Drawings

PROBABILISTIC UNCERTAINTY ESTIMATOR

CROSS-REFERENCE TO RELATED APPLICATIONS

This application is a National Phase Application of PCT Application Number PCT/US2007/006802 filed Mar. 19, 2007, which claims the benefit of and priority to U.S. Application No. 60/783,560 filed Mar. 17, 2006.

TECHNICAL FIELD

The present invention relates to the computation of that portion of the uncertainty of a quantitative radiation measurement coming from the calibration process, when the calibration method is an imprecise representation of the actual sample measurement conditions.

BACKGROUND ART

The quantification of the amount of radioactivity is not an exact process. There is always an uncertainty in the quantity that has been determined.

One contribution to the total uncertainty is commonly called "counting statistics" and arises from the fact that the measurement process counts discrete events that occur in a random manner from the decay of the radioactive atoms. The evaluation of the uncertainty from this process is well known and can be determined by mathematical techniques.

Another contribution to the total uncertainty is the uncertainty in the calibration factor. Calibration factors are necessary to relate the measured quantity to the quantity emitted from the radioactive source. Calibration factors are also referred to as interaction probabilities or detection efficiencies. These calibration factors can be determined by the measurement of well known radioactive sources that have been prepared in a manner to closely mimic the unknown sample being measured. Alternatively, calibration factors can be determined by a mathematical process whereby the radiation physical parameters of the sensor and the sample are defined, and the physics of radiation interaction with materials is defined, and where the probability of radiation from the sample interacting with the sensor is computed mathematically. One such example of mathematical computation method for efficiency calibration is described in the U.S. Pat. No. 6,228,664, titled "Calibration Method for Radiation Spectroscopy", issued May 8, 2001, to the inventors of the present invention, and assigned to the assignee of the present invention/application.

Then, either the source-based calibration factor or the mathematically computed calibration factor is used to convert the measurement instrument output into the quantity of radioactivity of the sample being measured. There is always some amount of imprecision or uncertainty associated with the calibration factor, even if the radioactive calibration source or the mathematical calibration model perfectly represents the sample being measured. This is due to the random factors involved in the radioactive decay and measurement process. The method of computation of this portion of the uncertainty in the calibration factor is also well known.

If the sample being measured is exactly like the radioactive source used for the source-based calibration or the mathematical model used for the mathematical calibration, then the propagation of the counting statistics uncertainty and the calibration factor uncertainty are adequate to compute the total uncertainty of the measurement. But that frequently is not the case. There are many situations where the sample measurement conditions are different in a radiologically significant manner from those used or defined in the calibration process. Examples include but are not limited to: sample density variations; sample composition variations; sample non-uniformity; source-detector distance variations; sample container variations; sample size variations; to name a few. Where these variations are known, they can be included in the calibration factor. But where they are not known or unpredictable then they must be treated as an uncertainty and propagated into the total measurement uncertainty. It is the computation of this component of the total measurement uncertainty that is the subject of this invention.

The traditional method of assigning uncertainty to these situations where there are variations in the sample measurement conditions is to consider one variable at a time, e.g. sample density variation, and evaluate its contribution to the uncertainty. Then evaluate the next variable, and so on in turn. Finally, combine the results according to conventional statistical methodology. The disadvantages of this method are that it is somewhat subjective, and that it doesn't account for the combined effects of multiple variables at the same time.

An alternate method would be to construct a very large number of radioactive calibration sources, where each of the variable dimensions or values in each of the large number of sources is chosen in a random manner, but where that choice of dimension or value follows the expected variation of that individual parameter. Then calibrate using each of this large number of sources and compute the mean and standard deviation of the calibration factor for this large number of source measurements. Use the mean for the actual efficiency, and use the standard deviation for the uncertainty. While this technique is quite correct, it is also technically challenging, very time consuming, and expensive.

Accordingly, it is a principal object of the invention to provide a method of probabilistic uncertainty estimation that produces results similar to those obtained by coning a very large number of radioactive calibration sources, as described above, but does so using mathematical modeling and numerical calculations.

Other objects of the invention, as well as particular features and advantages thereof, will be apparent or be elucidated in the following description and the accompanying drawing figures.

DISCLOSURE OF INVENTION

The present invention accomplishes the above object, among others, in one aspect of the invention, comprising:
  a method of accurately defining a mathematical model of the sensor, the sample, and other items affecting the efficiency;
  a method of defining the default or expected or normal dimensions or values of each of the parameters in the mathematical model;
  a method of defining which of the values or parameters in the mathematical model are variables;
  a method of defining the range of variation of each of the variables in the model;
  a method of either assuming a particular shape of the variation within the defined range, or a method of allowing the user to define a particular shape of the distribution within the defined range;
  a method of randomly selecting a value for each of the variable parameters in the model, using either the assumed distribution shape, or the user-defined distribution shape to create a mathematical model of one possible variation of source-detector measurement configuration;

a method of using this mathematical model and dimensions to compute the calibration factor for the defined source-detector measurement configuration;

a method to repeat this random selection process a large number of times; and a method to then compute mean or average value of the calibration factor, and statistical parameters describing the uncertainty in that calibration factor.

In a further aspect of the invention:

all of the above but using the mathematical model to compute the calibration factor for each of several energies, in order to evaluate the calibration factor and the uncertainty in the calibration factor versus energy response of the measurement apparatus.

BEST MODE FOR CARRYING OUT THE INVENTION

The invention presented here does the same thing as constructing a very large number of radioactive calibration sources, but does this by using mathematical modeling and numerical calculations.

The invention is implemented as a soft computer program. This program is either part of another software program that computes the calibration factor, such as the one covered under U.S. Pat. No. 6,228,664, or incorporates the portions of such program, or uses software techniques to call and utilize the required elements of that program.

The user first obtains the dimensions and other physical parameters that best represent the object under measurement. Some of these dimensions and parameters will be quite easy to measure or determine accurately and do not change, while other dimensions and parameters are variable and therefore "Not Well Known" or NWK.

For those dimensions and other parameters that are NWK, the user obtains the upper and lower limits of those parameters, and also a shape parameter that describes how the parameter or dimension can vary within or about those limits. Examples of shape parameters are: uniform, triangular, 1 standard deviation, 2 standard deviations, 3 standard deviations.

The software invention then uses these shape parameters as weighting factors and uses the limits to create a single random number for each of the NWK parameters that are used to represent the object under measurement. The set of parameters defining the object under measurement is called a model.

The process in the preceding paragraph is repeated a large number of times, creating a large number of models, each with somewhat different sets of parameters.

Some additional software, e.g. U.S. Pat. No. 6,228,664, is used to compute the calibration factor for a specified detector for each of the models, for the total of all energies, or for one or more specific energy values.

This set of computed calibration factors, derived from the large number of mathematical models is evaluated using common statistical techniques, to determine the appropriate statistical parameters, such as mean and standard deviation. If there are multiple energies, this process is repeated for each of those energies.

The user now has the mean calibration factor for one or more energies, and one or more statistical parameters describing the variability or uncertainty at each of those energies. This is the output from this invention.

Those values may be used directly in subsequent manual or computerized calculations, or incorporated into a formula to represent the efficiency versus energy shape, commonly called a calibration curve, which is then used in subsequent calculations.

It will thus be seen that the object set forth above, among those elucidated in, or made apparent from, the preceding description, are efficiently attained and, since certain changes may be made in the above method without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention that, as a matter of language, might be said to fall therebetween.

The invention claimed is:

1. A calibration factor uncertainty estimation system comprising:
    (a) a module for receiving a signal from a spectroscopic detector;
    (b) a radiation source/sensor mathematical model (RSMM), said RSMM further comprises known radiation source/sensor physical parameters (RSPP) and radiation source/sensor variable parameters (RSVP); and
    (c) a computing device, configured to accept said RSMM; wherein:
    said RSVP are assigned a lower source/sensor parameter value (LSPV) and an upper source/sensor parameter value (USPV) and a source/sensor shape parameter (SSHP) describing how said RSVP may vary between said LSPV and said USPV; and
    said computing device executes machine instructions operable to execute steps comprising:
    (1) selecting statistically random radiation source/sensor values (RRSV) for each RSVP, wherein said RRSV lies between said LSPV and said USPV and wherein said RRSV varies based on said SSHP:
    (2) computing radiation source/sensor calibration factors (RSCF) for said RSMM using said RSPP and said RRSV values;
    (4) computing the individual mean and standard deviation of each of said RSCF to determine the source/sensor calibration factor uncertainty estimation (SCFU) of each of said RSCF, wherein said RSCF and said SCFU are applied to the signal from a spectroscopic detector to produce an estimate of the radiation level sensed by said spectroscopic detector using the RSCF, and the estimated uncertainty of said radiation level.

2. The calibration factor uncertainty estimation system of claim 1 wherein said steps (3)-(4) are executed for one or more radiation energy values.

* * * * *

UNITED STATES PATENT AND TRADEMARK OFFICE
CERTIFICATE OF CORRECTION

PATENT NO. : 8,335,670 B2
APPLICATION NO. : 12/293343
DATED : December 18, 2012
INVENTOR(S) : Frazier Bronson et al.

Page 1 of 1

It is certified that error appears in the above-identified patent and that said Letters Patent is hereby corrected as shown below:

Title Page:
In Section 86, please delete "Oct. 5, 2008" and insert --Dec. 5, 2008--.

In the Specification:
Line 37, please delete "coning" and insert --constructing--.

In the Claims:
Claim 1, column 4, line 50, please delete "(4)" and insert --(3)--.

Claim 2, column 4, line 59, please delete "(3)-(4)" and insert --(2)-(3)--.

Signed and Sealed this
Thirtieth Day of April, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,335,670 B2  
APPLICATION NO. : 12/293343  
DATED : December 18, 2012  
INVENTOR(S) : Frazier Bronson et al.

Page 1 of 1

It is certified that error appears in the above-identified patent and that said Letters Patent is hereby corrected as shown below:

Title Page:
Item (86), please delete "Oct. 5, 2008" and insert --Dec. 5, 2008--.

In the Specification:
Column 2, line 37, please delete "coning" and insert --constructing--.

In the Claims:
Claim 1, column 4, line 50, please delete "(4)" and insert --(3)--.

Claim 2, column 4, line 59, please delete "(3)-(4)" and insert --(2)-(3)--.

This certificate supersedes the Certificate of Correction issued April 30, 2013.

Signed and Sealed this  
Twenty-eighth Day of May, 2013

Teresa Stanek Rea  
*Acting Director of the United States Patent and Trademark Office*